April 3, 1945.  J. A. DAVIS  2,372,884
LOCK NUT
Filed Sept. 25, 1943
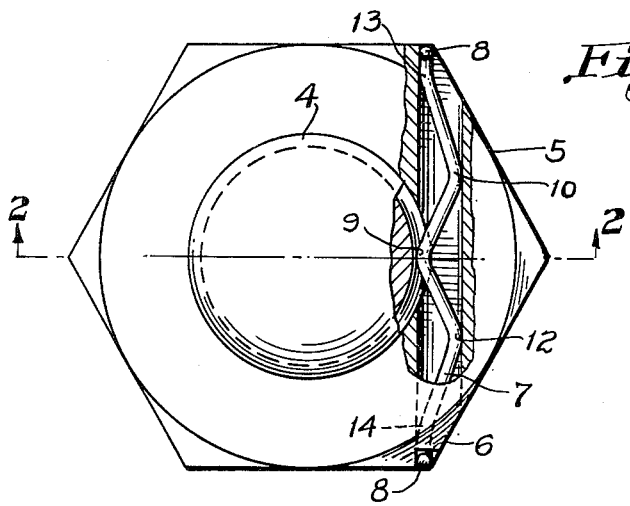
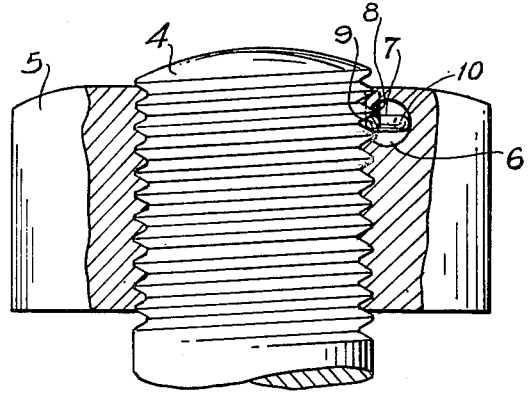
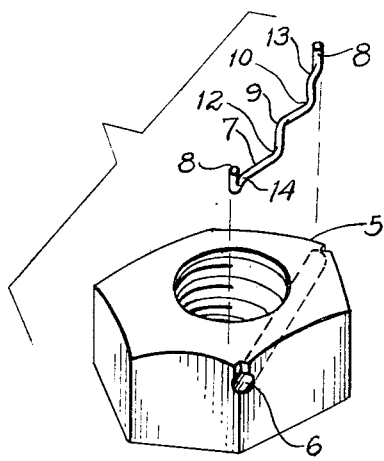
INVENTOR.
James A. Davis
BY Carlos G. Stratton
ATTORNEY.

Patented Apr. 3, 1945

2,372,884

UNITED STATES PATENT OFFICE 2,372,884

LOCK NUT

James A. Davis, Los Angeles, Calif.

Application September 25, 1943, Serial No. 503,746

6 Claims. (Cl. 151—26)

My invention relates to a lock nut, and has for its principal object to provide a lock nut that will prevent vibratory movement of either the bolt or the nut loosening the nut.

Another object is to provide means by which any nut may be converted into a lock nut by the simple expedient of boring a single hole and properly applying an appropriate spring wire.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a plan view showing an embodiment of my invention.

Fig. 2 is a section taken on the line 2—2 of Fig. 1.

Fig. 3 is a reduced perspective view of my present lock nut, with the parts disassembled.

Referring more in detail to the drawing, the reference number 4 generally indicates a bolt of conventional form. A nut is shown at 5 having a bore 6 extending from side to side of the nut, between the ends of the nut and substantially tangent to the threads in the nut. The bore 6 is preferably disposed with its greatest width approximately tangent to, and opening into, the second thread from an end face of the nut, as shown in Fig. 2.

Arranged lengthwise in the bore 6 is a spring steel wire 7 of approximately the same gauge as the thread of the nut. The wire 7 has laterally bent ends 8 that extend upwardly in Figs. 2 and 3. The central portion of the wire 7 has a hump 9 that bends towards the axis of the nut, as perhaps best shown in broken lines in Fig. 1.

In the use of my lock nut, the wire 7 is inserted lengthwise in the bore 6, with the hump 9 extending toward the axis of the nut. Then the ends 8 are bent laterally, as shown and described herein, to prevent lengthwise displacement of the wire. By reason of the inherent spring tension in the wire 7 and because the bends are exaggerated in the wire before placing it in the nut, oppositely extending humps 10 and 12 bear with considerable tension against the opposite side of the bore 6, away from the tapped opening of the nut. The end portions 13 and 14 of the wire bear against the side of the bore 6 adjacent the opening through the nut. Due to the exaggerated bends in the wire (greater than shown in Fig. 1), placing the wire 7 in the bore 9 partially flattens the humps and thereby places the wire 7 under tension, which resiliently urges the hump 9 into the thread of the bolt.

The wire 7 is preferably placed a couple of threads down from an end of the nut so that the pressure may be applied to threads of the bolt at a distance from the end of the bolt, assuming that the bolt is screwed entirely through the nut. By this means, the tension of the hump 9 upon the threads of the bolt 4 resiliently tend to resist the unscrewing of the nut from the bolt. The wire 7 is preferably approximately the size of the gauge of the threads of the nut 5.

It is believed clear without further illustration that similar locking arrangements may be applied approximately two threads form each end of the nut, whereby to have two wires 7 resiliently resisting unscrewing of the nut from the bolt.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A lock nut comprising a nut having a bore extending from side to side thereof, extending from side to side of the nut substantially tangent to the threads therein and connecting with the tapped opening in the nut, and a spring wire under tension in the bore and removable from either end thereof, the wire having a projecting mid-portion extending into the connecting opening, to engage threads of a bolt screwed into the nut.

2. A lock nut comprising a nut having an opening substantially tangent to the threads in the nut and connecting with the tapped opening in the nut, and a M shaped, resilient wire in the opening having the central portion of the M disposed in the connecting opening, said central portion being under tension to resiliently engage threads of a bolt screwed into the nut.

3. A lock nut comprising a nut having an open end bore between the sides thereof, extending from side to side of the nut substantially tangent to the threads therein and a spring wire having bent ends at the ends of the bore preventing accidental removal therefrom, said bent ends extending laterally beyond the circumference of the bore at the ends thereof to form abutting engagement with the sides of the nut and the wire having a resilient portion arranged to yieldingly engage threads of a bolt screwed into the nut, at the portion of the bore that is adjacent the tapped opening in the nut.

4. A lock nut comprising a nut having a bore laterally spaced from the ends of the nut and disposed substantially tangent to the threads therein and extending from side to side of the nut and connecting with the tapped opening in the nut and a spring wire substantially smaller in diameter than the diameter of the opening and bent to provide a hump projecting into the tapped opening of the nut and bent to provide portions resiliently engaging the opposite face of the bore, placing the wire under tension, and having bent ends at the ends of the bore preventing accidental longitudinal removal therefrom.

5. In combination a nut as described having a tapped bore and a locking member bore substantially tangent and transverse thereto, there being an opening between said bores, said nut having a lateral recess adjacent each end of said locking member bore, and an elongated resilient locking member having a laterally bent central portion adapted to engage a bolt thread groove and bent ends adapted for locking engagement with said lateral recesses.

6. In combination a nut as described having a tapped bore and a locking member bore substantially tangent and transverse thereto, there being an opening between said bores, said nut having a lateral recess adjacent each end of said locking member bore, and an elongated resilient locking member having a laterally bent central portion adapted to engage a bolt thread groove and bent ends adapted for locking engagement with said lateral recesses, said locking member adapted to be inserted in said locking member bore without engaging the bolt thread groove and to be rotated to engage said groove and recesses.

JAMES A. DAVIS.